United States Patent
Parenti et al.

(10) Patent No.: US 12,288,402 B2
(45) Date of Patent: Apr. 29, 2025

(54) AUTOMATICALLY GENERATING MACHINE-LEARNING TRAINING DATA

(71) Applicant: Ford Global Technologies, LLC, Dearborn, MI (US)

(72) Inventors: Robert Parenti, Dearborn, MI (US); Adil Nizam Siddiqui, Farmington Hills, MI (US); Cynthia M. Neubecker, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 368 days.

(21) Appl. No.: 17/850,241

(22) Filed: Jun. 27, 2022

(65) Prior Publication Data
US 2023/0419680 A1 Dec. 28, 2023

(51) Int. Cl.
*G06V 20/58* (2022.01)
*B60W 40/08* (2012.01)

(52) U.S. Cl.
CPC .............. *G06V 20/58* (2022.01); *B60W 40/08* (2013.01); *B60W 2420/403* (2013.01); *B60W 2420/408* (2024.01)

(58) Field of Classification Search
CPC ........ G06V 20/58; G06V 10/82; G06V 20/56; G06V 20/59; G06V 10/774; G06V 10/764; B60W 40/08; B60W 2420/403; B60W 2420/408; G06N 20/00
See application file for complete search history.

(56) References Cited

U.S. PATENT DOCUMENTS

| | | | |
|---|---|---|---|
| 11,145,058 B2 | 10/2021 | Arbel et al. | |
| 2007/0070069 A1 | 3/2007 | Samarasekera et al. | |
| 2021/0263157 A1* | 8/2021 | Zhu | G01S 17/89 |
| 2021/0319363 A1 | 10/2021 | Gillberg et al. | |
| 2021/0342600 A1 | 11/2021 | Westmacott et al. | |
| 2023/0110027 A1* | 4/2023 | Bajpayee | B60W 30/09 |
| | | | 701/301 |

* cited by examiner

*Primary Examiner* — Jianxun Yang
(74) *Attorney, Agent, or Firm* — Frank Lollo; Brooks Kushman P.C.

(57) ABSTRACT

A computer includes a processor and a memory, and the memory stores instructions executable by the processor to receive first environmental data recorded by an environmental sensor on board a vehicle, receive nonenvironmental data recorded on board the vehicle independently of the first environmental data, add a plurality of annotations derived from the nonenvironmental data to the environmental data, and train a machine-learning program to process second environmental data by using the first environmental data as training data and the annotations as ground truth for the first environmental data.

16 Claims, 4 Drawing Sheets

(12) United States Patent

AUTOMATICALLY GENERATING MACHINE-LEARNING TRAINING DATA

BACKGROUND

Object recognition is a computer vision technique for identifying objects in images or videos. Object recognition often relies on machine-learning programs. Machine-learning programs are trained using training data. Training data is typically data of a same type that the machine-learning program will receive as input, along with some data serving as ground truth, which is what the machine-learning program will be trained to output. In the case of object recognition, the training data are typically images or videos along with labels of the objects contained in the images or videos.

DETAILED DESCRIPTION

Figure 1:
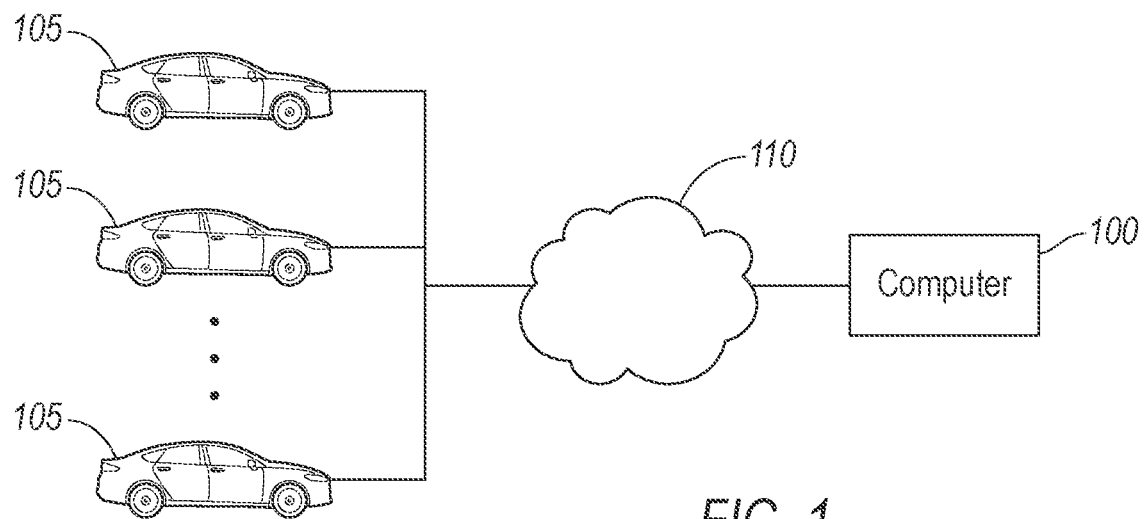
FIG. 1 is a block diagram of an example plurality of vehicles in communication with a server.

This disclosure provides techniques for efficiently training a machine-learning program such as an object-recognition system. A computer is programmed to receive first environmental data recorded by an environmental sensor on board a vehicle, receive nonenvironmental data recorded on board the vehicle independently of the first environmental data, add a plurality of annotations derived from the nonenvironmental data to the environmental data, and train the machine-learning program to process second environmental data by using the first environmental data as training data and the annotations as ground truth for the first environmental data. The environmental sensor can be, e.g., a camera, a lidar, a radar, an ultrasonic sensor, etc. that detects features of an environment external to the vehicle, i.e., environmental data. The nonenvironmental data may be audio data recorded from a passenger cabin of the vehicle that is then converted to text to serve as the annotations. For example, an occupant of the vehicle may verbally identify objects or situations that the environmental sensor is recording. Alternatively or additionally, the nonenvironmental data may be data transmitted over a vehicle network of the vehicle, e.g., a controller area network (CAN) bus of the vehicle. This data may be generated by components of the vehicle during normal operation of the vehicle. The use of the nonenvironmental data provides efficient generation of a specific data structure, the annotated training data for the machine-learning program. Furthermore, the use of the nonenvironmental data may allow for training the machine-learning program on a larger set of training data, thereby potentially increasing an accuracy of the machine-learning program.

A computer includes a processor and a memory, and the memory stores instructions executable by the processor to receive second environmental data of an area outside a second vehicle, execute a machine-learning program with the second environmental data as input, and actuate a component of the second vehicle based on the execution of the machine-learning program. The machine-learning program is trained by receiving first environmental data of an area outside a first vehicle recorded by an environmental sensor on board the first vehicle, receiving nonenvironmental data recorded on board the first vehicle about an inside of the first vehicle, adding a plurality of annotations derived from the nonenvironmental data to the first environmental data, and training the machine-learning program to process the second environmental data by using the first environmental data as training data and the annotations as ground truth for the first environmental data.

The component may include at least one of a propulsion system, a brake system, or a steering system.

The nonenvironmental data may be time-synchronized with the first environmental data. The machine-learning program may be further trained by receiving speed data that is time-synchronized with the first environmental data, and adding the annotations may be based on the speed data. The machine-learning program may be further trained by determining a plurality of annotation times for the respective annotations based on the speed data, and adding the annotations may include adding the annotations at the respective annotation times. The annotations may be derived from the nonenvironmental data at a plurality of respective record times, and determining the annotation times may include applying offsets to the record times, the offsets dependent on the speed data.

The environmental sensor may generate the first environmental data at a constant data rate, and determining the annotation times may be based on the data rate.

The nonenvironmental data may include audio data. The machine-learning program may be further trained by converting the audio data to text, and the annotations may be derived from the text.

The audio data may be recorded from a passenger cabin of the first vehicle.

The nonenvironmental data may include data transmitted over a vehicle network of the first vehicle. The nonenvironmental data may be generated by components of the first vehicle.

The nonenvironmental data may be automatically generated on board the first vehicle.

The vehicle network may include a controller area network (CAN) bus.

The first environmental data may be based on electromagnetic radiation.

The first environmental data may be first video data, the environmental sensor may be a camera, and the second environmental data may be second video data. The machine-learning program may be trained to perform image recognition.

The environmental sensor may be one of a radar or a lidar.

When used to train the machine-learning program, the first environmental data may lack manually added annotations.

A method includes receiving first environmental data of an area outside a first vehicle recorded by an environmental sensor on board the first vehicle, receiving nonenvironmental data recorded on board the first vehicle about an inside of the first vehicle, adding a plurality of annotations derived from the nonenvironmental data to the first environmental data, training a machine-learning program to process second environmental data by using the first environmental data as training data and the annotations as ground truth for the first environmental data, installing the machine-learning program on a vehicle computer of a second vehicle, and actuating a component of the second vehicle based on the machine-learning program.

With reference to the Figures, wherein like numerals indicate like parts throughout the several views, a computer 100 includes a processor and a memory, and the memory stores instructions executable by the processor to receive first environmental data recorded by an environmental sensor 200 on board a vehicle 105, receive nonenvironmental data recorded on board the vehicle 105 independently of the first environmental data, add a plurality of annotations derived from the nonenvironmental data to the environmental data, and train a machine-learning program to process second environmental data by using the first environmental data as training data and the annotations as ground truth for the first environmental data.

With reference to FIG. 1, the computer 100 may communicate with a plurality of the vehicles 105. The vehicles 105 may each be any passenger or commercial automobile such as a car, a truck, a sport utility vehicle, a crossover, a van, a minivan, a taxi, a bus, etc.

The vehicles 105 can communicate with the computer 100 over a network 110. The network 110 represents one or more mechanisms by which the computer 100 may communicate with remote entities. Accordingly, the network 110 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The computer 100 is a microprocessor-based computing device, e.g., a generic computing device including a processor and a memory. The memory of the computer 100 can include media for storing instructions executable by the processor as well as for electronically storing data and/or databases. The computer 100 can be multiple computers coupled together. The computer 100 is remote from the vehicles 105, i.e., located at a place that is spaced from the vehicles 105 and may be distant from the vehicles 105.

Figure 2:
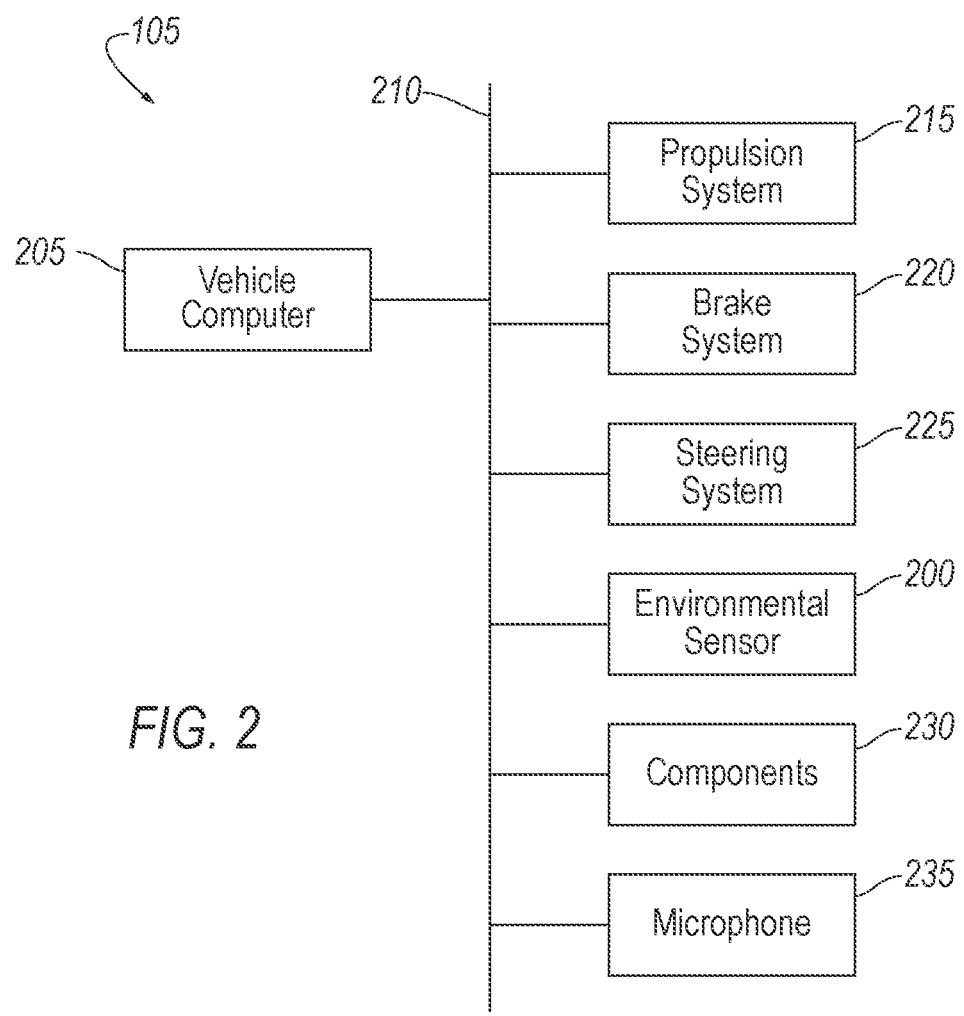
FIG. 2 is a block diagram of one of the vehicles.

With reference to FIG. 2, each vehicle 105 can include a respective vehicle computer 205 on board the vehicle 105. The vehicle computer 205 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 205 can thus include a processor, a memory, etc. The memory of the vehicle computer 205 can include media for storing instructions executable by the processor as well as for electronically storing data and/or databases, and/or the vehicle computer 205 can include structures such as the foregoing by which programming is provided. The vehicle computer 205 can be multiple computers coupled together on board the vehicle 105.

The vehicle computer 205 may transmit and receive data through a vehicle network 210 such as a controller area network (CAN) bus, Ethernet, WiFi, Local Interconnect Network (LIN), onboard diagnostics connector (OBD-II), and/or by any other wired or wireless communications network. The vehicle computer 205 may be communicatively coupled to a propulsion system 215, a brake system 220, a steering system 225, the environmental sensor 200, other components 230, and a microphone 235 via the vehicle network 210.

The propulsion system 215 of the vehicle 105 generates energy and translates the energy into motion of the vehicle 105. The propulsion system 215 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 215 can include an electronic control unit (ECU) or the like that is in communication with and receives input from the vehicle computer 205 and/or a human operator. The human operator may control the propulsion system 215 via, e.g., an accelerator pedal and/or a gear-shift lever.

The brake system 220 is typically a conventional vehicle braking subsystem and resists the motion of the vehicle 105 to thereby slow and/or stop the vehicle 105. The brake system 220 may include friction brakes such as disc brakes, drum brakes, band brakes, etc.; regenerative brakes; any other suitable type of brakes; or a combination. The brake system 220 can include an electronic control unit (ECU) or the like that is in communication with and receives input from the vehicle computer 205 and/or a human operator. The human operator may control the brake system 220 via, e.g., a brake pedal.

The steering system 225 is typically a conventional vehicle steering subsystem and controls the turning of the wheels. The steering system 225 may be a rack-and-pinion system with electric power-assisted steering, a steer-by-wire system, as both are known, or any other suitable system. The steering system 225 can include an electronic control unit (ECU) or the like that is in communication with and receives input from the vehicle computer 205 and/or a human operator. The human operator may control the steering system 225 via, e.g., a steering wheel.

The environmental sensor 200 detects features of the external environment that are within a field of view of the environmental sensor 200, e.g., objects and/or characteristics of surroundings of the vehicle 105, such as other vehicles, road lane markings, traffic lights and/or signs, pedestrians, etc. For example, the environmental sensor 200 may be a camera, a radar, a lidar, an ultrasonic sensor, etc. As a camera, the environmental sensor 200 can detect electromagnetic radiation in some range of wavelengths. For example, the environmental sensor 200 may detect visible light, infrared radiation, ultraviolet light, or some range of wavelengths including visible, infrared, and/or ultraviolet light. For example, the environmental sensor 200 can be any suitable type of camera, e.g., a charge-coupled device (CCD), complementary metal oxide semiconductor (CMOS), etc. As a lidar, the environmental sensor 200 detects distances to objects by emitting laser pulses at a particular wavelength and measuring the time of flight for the pulse to travel to the object and back. The environmental sensor 200 can be any suitable type of lidar, e.g., spindle-type lidar, solid-state lidar, flash lidar, etc. As a radar, the environmental sensor 200 transmits radio waves and receives reflections of those radio waves to detect physical objects in the environment. The environmental sensor 200 can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves. As an ultrasonic sensor, the environmental sensor 200 measures distances to features of the environment by emitting ultrasonic sound waves and converting the reflected sound into an electrical signal. The environmental sensor 200 may be any suitable type of ultrasonic sensor, e.g., one with a field of view with a comparatively wide horizontal angle and narrow vertical angle.

Figure 3:
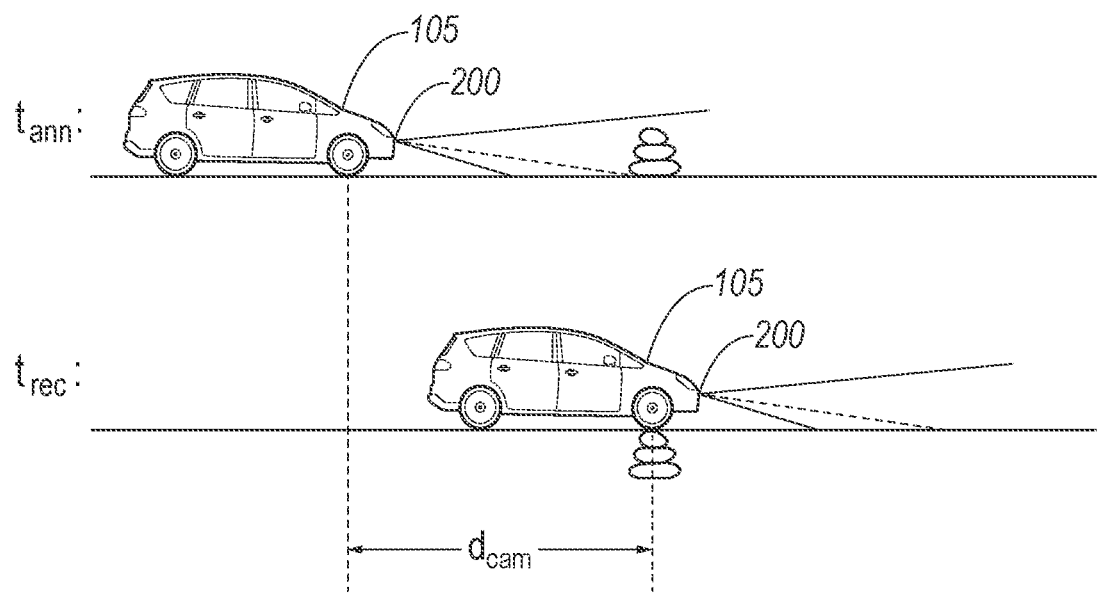
FIG. 3 is a diagram of the vehicle encountering an example feature of the environment.

The environmental sensor 200 is positioned on board the vehicle 105, e.g., fixed relative to a body of the vehicle 105. For example, the environmental sensor 200 may be oriented in a vehicle-forward direction, thereby giving a view of what the vehicle 105 will encounter when traveling forward, as shown in FIG. 3.

The environmental sensor 200 generates first environmental data based on electromagnetic radiation, e.g., light or radio waves. The first environmental data is of a type depending on the type of the environmental sensor 200, e.g., image or video data for a camera, a point cloud for a radar or lidar, etc. The first environmental data is of the field of view of the environmental sensor 200, e.g., an area outside the vehicle 105, e.g., an area in front of the vehicle 105. The environmental sensor 200 can generate the first environmental data at a constant data rate, i.e., a rate of generating a new set of the first environmental data encompassing the field of view of the environmental sensor 200, e.g., a frame rate for a camera. The term "iteration" will be used for each generation of a new set of the first environmental data encompassing the field of view, e.g., each frame for video data.

The components 230 include parts of the vehicle 105 that generate data transmitted over the vehicle network 210. For example, the components 230 may include parts of the propulsion system 215, the brake system 220, and the steering system 225. For another example, the component 230 may include a variety of sensors besides the environmental sensor 200. The sensors may provide data about operation of the vehicle 105, e.g., wheel speed, wheel orientation, and engine and transmission data (e.g., temperature, fuel consumption, etc.). The sensors may detect the location and/or orientation of the vehicle 105, e.g., global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers.

The components 230 generate nonenvironmental data on board the vehicle 105 about an inside of the vehicle 105. The nonenvironmental data may be automatically generated on board the vehicle 105 by the components 230, e.g., as a byproduct or purpose of the operation of the components 230. The nonenvironmental data may be transmitted over the vehicle network 210, e.g., to the vehicle computer 205 or other ECUs. The nonenvironmental data may be recorded on board the vehicle 105 independently of the first environmental data, i.e., the nonenvironmental data does not result from any interactions with the first environmental data. The nonenvironmental data may include speed data indicating a speed of the vehicle 105, e.g., from a speedometer or calculated from wheel speed sensors.

The microphone 235 is a transducer that converts sound to an electrical signal. The microphone 235 can be any suitable type, e.g., a dynamic microphone, which includes a coil of wire suspended in a magnetic field; a condenser microphone, which uses a vibrating diaphragm as a capacitor plate; a contact microphone, which uses a piezoelectric crystal; etc.

The microphone 235 is positioned to detect sound in a passenger cabin of the vehicle 105. For example, the microphone 235 may be mounted within the passenger cabin, e.g., to an instrument panel, and oriented toward the seats in the passenger cabin.

The nonenvironmental data may include audio data from the microphone 235. The microphone 235 records the audio data from the passenger cabin. The audio data may include speech uttered by occupants of the vehicle 105.

The nonenvironmental data may be time-synchronized with the first environmental data, i.e., a correspondence is mapped between times of pieces of data from the nonenvironmental data and times of pieces of data from the first environmental data. For example, events in the nonenvironmental data may have respective times t according to a clock instantiated on the vehicle computer 205, and the first environmental data may have a starting time $t_0$ according to the clock and a known data rate fps. If an event in the nonenvironmental data occurs at a time t, an index f for iterations of the first environmental data since the starting time $t_0$ (e.g., an fth frame of video data) may be calculated with the following equation: $f=fps*(t-t_0)$. Different types of nonenvironmental data may be time-synchronized with the first environmental data, e.g., different data transmitted over the vehicle network 210, speed data, audio data, etc.

The computer 100 is programmed to derive annotations from the nonenvironmental data for the first environmental data. The annotations may be derived from multiple types of the nonenvironmental data, e.g., from the nonenvironmental data transmitted over the vehicle network 210, from the audio data, etc. Different rules may apply to deriving annotations from different types of the nonenvironmental data.

The computer 100 may be programmed to derive the annotations from the nonenvironmental data transmitted over the vehicle network 210, e.g., over a portion of the vehicle network 210 such as the CAN bus. The annotations may be derived according to a set of criteria, e.g., with each specific annotation having a corresponding criterion. For example, one criterion may be that a difference in wheel speeds between two of the wheels is greater than a threshold. If the difference between two of the wheel speeds is greater than the threshold, then the annotation "wheel slip" may be derived. The threshold may be chosen to indicate that one of the wheels is slipping. For another example, one criterion may be a compression of a shock absorber greater than a threshold. If the shock absorber compresses, i.e., decreases in length from a relaxed length, by greater than the threshold, then the annotation "bump" may be derived. The threshold may be chosen to indicate a road feature larger than general road roughness, e.g., corresponding to a speed bump or curb.

The computer 100 may be programmed to convert the audio data to text for use as annotations. The computer 100 can use any suitable algorithm for converting speech to text, e.g., hidden Markov models, dynamic time warping-based speech recognition, neural networks, end-to-end speech recognition, etc.

The computer 100 may be programmed to derive the annotations from the text. For example, the text may simply be applied as the annotations. For another example, the computer 100 may store a preset list of words and/or phrases, and portions of text that match an entry on the preset list may trigger the annotations. The annotations may be the same as the text matching the entry, or the computer 100 may store corresponding annotations for the entries, e.g., if "yellow" is on the preset list, the corresponding annotation may be "yellow traffic light," i.e., if the text includes the word "yellow," then the computer 100 derives and applies the annotation "yellow traffic light."

With reference to FIG. 3, the annotations may be derived from the nonenvironmental data at a plurality of respective record times, i.e., each annotation has a corresponding record time. The record time is the time at which the nonenvironmental data triggering the annotation occurred, as shown in the lower panel of FIG. 3. Using the examples above, the record times may include the times at which the difference in wheel speeds exceeded the threshold, the compression of one of the shock absorbers exceeded the threshold, speech matching an entry on the preset list was uttered, etc.

The computer 100 may be programmed to determine a plurality of annotation times at which to add the annotations to the first environmental data. The annotation time is the time of the first environmental data to which the annotation is applied. The annotation times may be different than the record times. Determining the annotation times may be based on the record times, the speed data, the data rate of the environmental sensor 200, and/or the type of nonenvironmental data. For example, annotation time may be an algorithm or function, e.g., a mathematical function, of the record time, the speed data, and/or the data rate of the environmental sensor 200, i.e., takes those values as arguments. The annotation time may occur sooner after the respective record time the faster the vehicle 105 is traveling. For another example, the function or algorithm for determining an annotation time may be different for different types of nonenvironmental data, as will be described below. The annotation time for audio data may occur sooner after the respective record time than the annotation time for data transmitted over the vehicle network 210.

Determining the annotation times may include applying offsets to the record times, as well as converting to the iteration number of the first environmental data. The offset $\Delta t$ can represent a difference between the annotation time and the record time, e.g., $\Delta t = t_{ann} - t_{rec}$, in which $t_{rec}$ is the record time and $t_{ann}$ is the annotation time according to a same clock as used for the record time. The offset $\Delta t$ can be negative, i.e., the annotation time $t_{ann}$ can occur before the record time $t_{rec}$, because an external stimulus may be detected by the environmental sensor 200 before its effects appear in the nonenvironmental data. The annotation time may then be converted to an iteration number, e.g., a frame number, of the first environmental data, e.g., $f_{rec} = fps*(t_{ann} - t_0)$, or in one step as $f_{rec} = fps*(t_{rec} + \Delta t - t_0)$.

The offsets may be dependent on the arrangement of the environmental sensor 200. For example, the environmental sensor 200 may be arranged to detect a distance $d_{cam}$ in front of the vehicle 105; e.g., if the environmental sensor 200 is aimed forward and tilted downward and the vehicle 105 is on straight, level ground, then a longitudinal center of the field of view of the environmental sensor 200 will intersect the ground at a distance $d_{cam}$ in front of the vehicle 105. The annotation time for an object or situation should occur when that object or situation is at the distance $d_{cam}$ in front of the vehicle 105, i.e., in the center of the field of view of the environmental sensor 200, as shown in the top panel of FIG. 3.

The computer 100 may be programmed to determine the offsets. The offsets may be dependent on the speed data and the type of the nonenvironmental data. For the nonenvironmental data transmitted over the vehicle network 210, such as the wheel speeds or shock-absorber compression, the record time should occur when the vehicle 105 is on top of the object or situation, i.e., the object or situation is at zero distance in front of the vehicle 105. The offset $\Delta t$ can be a function of the speed data, e.g., $\Delta t = -d_{cam}/v$, in which v is the speed of the vehicle 105.

For the audio data, the record time should occur when the object or situation is at a typical gaze distance $d_{gaze}$ of the operator. The typical gaze distance $d_{gaze}$ may be determined experimentally and then stored in the memory of the computer 100. The offset $\Delta t$ can be a function of the speed data, e.g., $\Delta t = (d_{gaze} - d_{cam})/v$.

The computer 100 may be programmed to add the annotations derived from the nonenvironmental data to the first environmental data at the respective annotation times, as determined above. For example, the computer 100 may store the annotations with tags for the annotation times in metadata of the first environmental data. The computer 100 may apply the annotations to annotation times within a margin of uncertainty of the annotation times as calculated above, e.g., ±50 iterations, i.e., from 50 iterations before the annotation time to 50 iterations after the annotation time. The margin of uncertainty may represent a typical statistical variation in the record times. The margin of uncertainty may be dependent on the type of nonenvironmental data, e.g., may be greater for audio data than for nonenvironmental data transmitted over the vehicle network 210 because of the large range of distances at which an occupant may be able to see.

The computer 100 is programmed to train a machine-learning program to process second environmental data by using the first environmental data as training data and the annotations as ground truth for the first environmental data. The second environmental data is a same type as the first environmental data, e.g., the first and second environmental data are both image data or video data. The machine-learning program may be any suitable type that accepts the first and second environmental data as input and outputs a classification, e.g., a convolutional neural network. The first environmental data enhanced with the annotations serve as the training data. The annotations serve as ground truth for iterations of the first environmental data to which the annotations have been applied; i.e., the machine-learning program is trained that, upon receiving an iteration of the first environmental data with an annotation, the machine-learning program should output that annotation. The first environmental data can lack manually added annotations because of the automatically generated annotations described above, increasing efficiency.

The machine-learning program can be trained to perform a classification task on data of a same type as the first environmental data. For example, the machine-learning program may be trained to perform image recognition. As a convolutional neural network, the machine-learning program includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type of object, e.g., each annotation associated with a criterion for the data transmitted over the vehicle network 210 and/or each entry on the preset list for the audio data. The final output is the type with the highest score.

The computer 100 may be programmed to, after training the machine-learning program, install the machine-learning program on a vehicle computer 205 of a vehicle 105, e.g., a vehicle computer 205 of a different vehicle 105 than collected the first environmental data. The vehicle computer 205 may be programmed to actuate the components 230 of the vehicle 105, e.g., the propulsion system 215, the brake system 220, and/or the steering system 225, based on the output of the machine-learning program using the second environmental data. For example, the machine-learning program may output "wheel slip" as a classification of the second environmental data showing an area in front of the vehicle 105. Upon receiving that output, the vehicle computer 205 may brake or decrease acceleration, reducing a likelihood of the wheels actually slipping.

Figure 4:
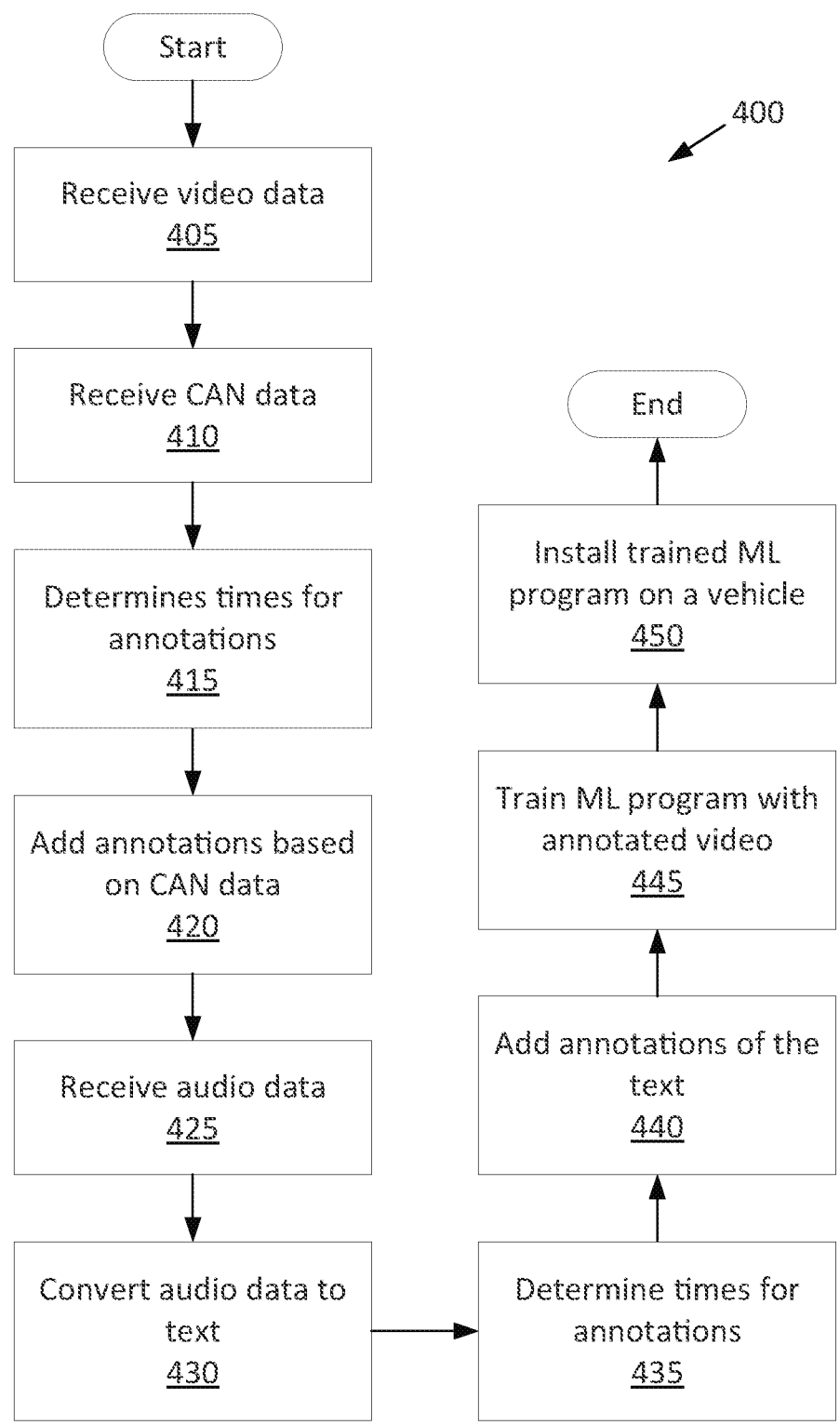
FIG. 4 is a process flow diagram of an example process for generating annotated environmental data from the vehicle to train a machine-learning program.

FIG. 4 is a process flow diagram illustrating an example process 400 for generating annotated first environmental data from the vehicle 105 to train the machine-learning program. The memory of the computer 100 stores executable instructions for performing the steps of the process 400 and/or programming can be implemented in structures such as mentioned above. As a general overview of the process 400, the computer 100 receives the first environmental data, receives the data transmitted over the vehicle network 210, determines the annotation times for the data transmitted over the vehicle network 210, adds the annotations for the data transmitted over the vehicle network 210 to the first environmental data, receives the audio data, converts the audio data to text, determines the annotation times for the audio data, adds the annotations for the audio data to the first environmental data, trains the machine-learning program using the annotated first environmental data, and installs the machine-learning program on a vehicle computer 205.

The process 400 begins in a block 405, in which the computer 100 receives the first environmental data recorded by the environmental sensor 200 on board the vehicle 105, as described above. The first environmental data may be from a single trip or multiple trips, and the computer 100 receives the first environmental data after the trip(s) are complete.

Next, in a block 410, the computer 100 receives the nonenvironmental data that is transmitted over the vehicle network 210, as described above, including the speed data.

Next, in a block 415, the computer 100 determines the annotation times for the nonenvironmental data transmitted over the vehicle network 210 based on the speed data, as described above.

Next, in a block 420, the computer 100 generates and adds the annotations from the data received in the block 410 to the first environmental data at the respective annotation times, as described above.

Next, in a block 425, the computer 100 receives the audio data, as described above.

Next, in a block 430, the computer 100 converts the audio data to text, as described above.

Next, in a block 435, the computer 100 determines the annotation times for the audio data received in the block 425, as described above.

Next, in a block 440, the computer 100 generates and adds the annotations from the audio data received in the block 425 to the first environmental data at the respective annotation times, as described above.

Next, in a block 445, the computer 100 trains the machine-learning program to process the second environmental data by using the first environmental data as training data and the annotations as ground truth for the first environmental data, as described above.

Next, in a block 450, the computer 100 installs the machine-learning program on a vehicle computer 205 of a vehicle 105, as described above. After the block 450, the process 400 ends.

Figure 5:
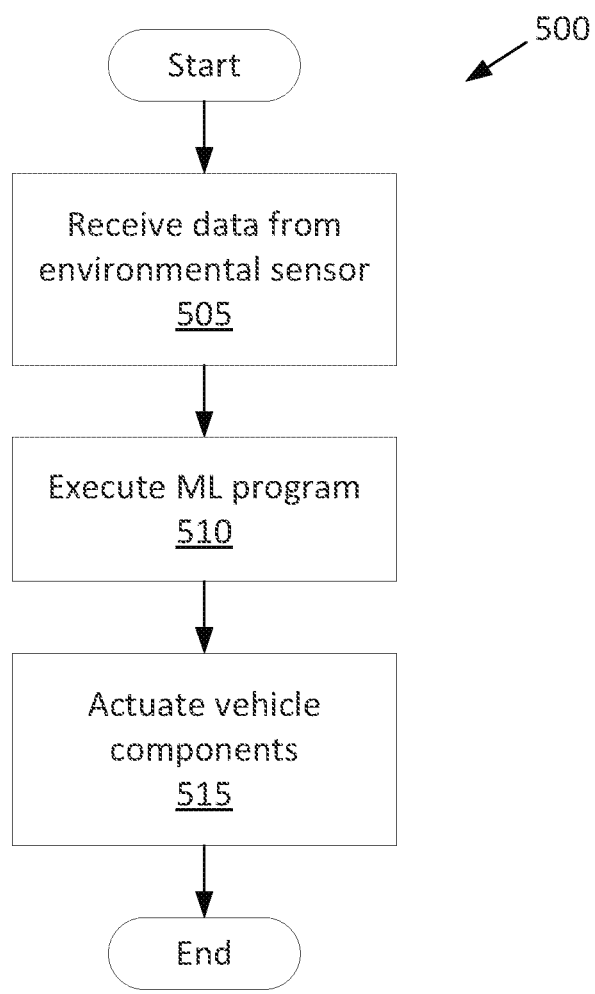
FIG. 5 is a process flow diagram of an example process for operating a vehicle based on the trained machine-learning program.

FIG. 5 is a process flow diagram illustrating an example process 500 for operating the vehicle 105 based on the trained machine-learning program. The memory of the vehicle computer 205 stores executable instructions for performing the steps of the process 500 and/or programming can be implemented in structures such as mentioned above. As a general overview of the process 500, the vehicle computer 205 receives second environmental data from the environmental sensor 200, executes the machine-learning program to perform a task on the second environmental data, and actuates the vehicle components 230 based on the task.

The process 500 begins in a block 505, in which the vehicle computer 205 receives the second environmental data from the environmental sensor 200. The computer 100 may receive the second environmental data in real time, i.e., as soon as the second environmental data is generated by the environmental sensor 200 based on the external environment.

Next, in a block 510, the vehicle computer 205 executes the machine-learning program to perform the classification task on the second environmental data received in the block 505, as described above.

Next, in a block 515, the vehicle computer 205 actuates a vehicle component 230 of the vehicle 105 based on the classifications from the block 510 (along with data from other sensors). For example, the vehicle computer 205 may actuate the propulsion system 215, the brake system 220, and/or the steering system 225. For example, the vehicle computer 205 may actuate the brake system 220 based on the classifications of the objects or situations ahead of the vehicle 105, e.g., to slow the vehicle 105 in certain scenarios. If, e.g., a slow-moving object such as a bicycle is ahead of the vehicle 105 or the upcoming terrain is classified as "wheel slip," the vehicle computer 205 may instruct the brake system 220 to actuate. For another example, the vehicle computer 205 may operate the vehicle 105 autonomously, i.e., actuating the propulsion system 215, the brake system 220, and the steering system 225 based on the classifications, e.g., to navigate the vehicle 105 around the objects in the environment. Autonomously operating the vehicle 105 may be based on the classifications of the objects, e.g., the vehicle computer 205 may navigate the vehicle 105 to provide a larger buffer if the object is a type that moves, e.g., motorcycle, than a type that is stationary, e.g., mailbox. After the block 515, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
   receive second environmental data of an area outside a second vehicle;
   execute a machine-learning program with the second environmental data as input; and
   actuate a component of the second vehicle based on the execution of the machine-learning program;
   wherein the machine-learning program is trained by:
      receiving first environmental data of an area outside a first vehicle recorded by an environmental sensor on board the first vehicle;
      receiving nonenvironmental data recorded on board the first vehicle about an inside of the first vehicle, the nonenvironmental data including at least one of audio data or motion data, the motion data indicating motion of the first vehicle, the nonenvironmental data being time-synchronized with the first environmental data;
      receiving speed data that is time-synchronized with the first environmental data;
      determining a plurality of annotation times for a plurality of respective annotations based on the speed data, the annotations being derived from the nonenvironmental data at a plurality of respective record times, wherein determining the annotation times includes applying offsets to the record times, resulting in offsetted times, and applying the annotations at the offsetted times instead of the record times, the offsets dependent on the speed data;

adding the annotations derived from the at least one of the audio data or the motion data to the first environmental data, adding the annotations being based on the speed data, the speed data indicating a speed at which the first vehicle is traveling, wherein adding the annotations includes adding the annotations at the respective annotation times; and training the machine-learning program to process the second environmental data by using the first environmental data as training data and the annotations as ground truth for the first environmental data.

2. The computer of claim 1, wherein the component includes at least one of a propulsion system, a brake system, or a steering system.

3. The computer of claim 1, wherein the environmental sensor generates the first environmental data at a constant data rate, and determining the annotation times is based on the data rate.

4. The computer of claim 1, wherein the nonenvironmental data includes the audio data, and the annotations are derived from the audio data.

5. The computer of claim 4, wherein the machine-learning program is further trained by converting the audio data to text, and the annotations are derived from the text.

6. The computer of claim 4, wherein the audio data is recorded from a passenger cabin of the first vehicle.

7. The computer of claim 1, wherein the nonenvironmental data includes data transmitted over a vehicle network of the first vehicle.

8. The computer of claim 7, wherein the nonenvironmental data is generated by components of the first vehicle.

9. The computer of claim 7, wherein the nonenvironmental data is automatically generated on board the first vehicle.

10. The computer of claim 7, wherein the vehicle network includes a controller area network (CAN) bus.

11. The computer of claim 1, wherein the first environmental data is based on electromagnetic radiation.

12. The computer of claim 1, wherein the first environmental data is first video data, the environmental sensor is a camera, and the second environmental data is second video data.

13. The computer of claim 12, wherein the machine-learning program is trained to perform image recognition.

14. The computer of claim 1, wherein, when used to train the machine-learning program, the first environmental data lacks manually added annotations.

15. The computer of claim 1, wherein the nonenvironmental data includes the motion data indicating the motion of the first vehicle, and the annotations are derived from the motion data.

16. A method comprising:
receiving first environmental data of an area outside a first vehicle recorded by an environmental sensor on board the first vehicle;

receiving nonenvironmental data recorded on board the first vehicle about an inside of the first vehicle, the nonenvironmental data including at least one of audio data or motion data, the motion data indicating motion of the first vehicle, the nonenvironmental data being time-synchronized with the first environmental data;

receiving speed data that is time-synchronized with the first environmental data;

determining a plurality of annotation times for a plurality of respective annotations based on the speed data, the annotations being derived from the nonenvironmental data at a plurality of respective record times, wherein determining the annotation times includes applying offsets to the record times, resulting in offsetted times, and applying the annotations at the offsetted times instead of the record times, the offsets dependent on the speed data;

adding the annotations derived from the at least one of the audio data or the motion data to the first environmental data, adding the annotations being based on the speed data, the speed data indicating a speed at which the first vehicle is traveling, wherein adding the annotations includes adding the annotations at the respective annotation times;

training a machine-learning program to process second environmental data by using the first environmental data as training data and the annotations as ground truth for the first environmental data;

installing the machine-learning program on a vehicle computer of a second vehicle; and actuating a component of the second vehicle based on the machine-learning program.

* * * * *